April 28, 1964  A. L. KEMPER ETAL  3,131,392
ALTERNATE FUNCTION VOR-LOC AIRCRAFT METER CIRCUIT
Filed July 16, 1962
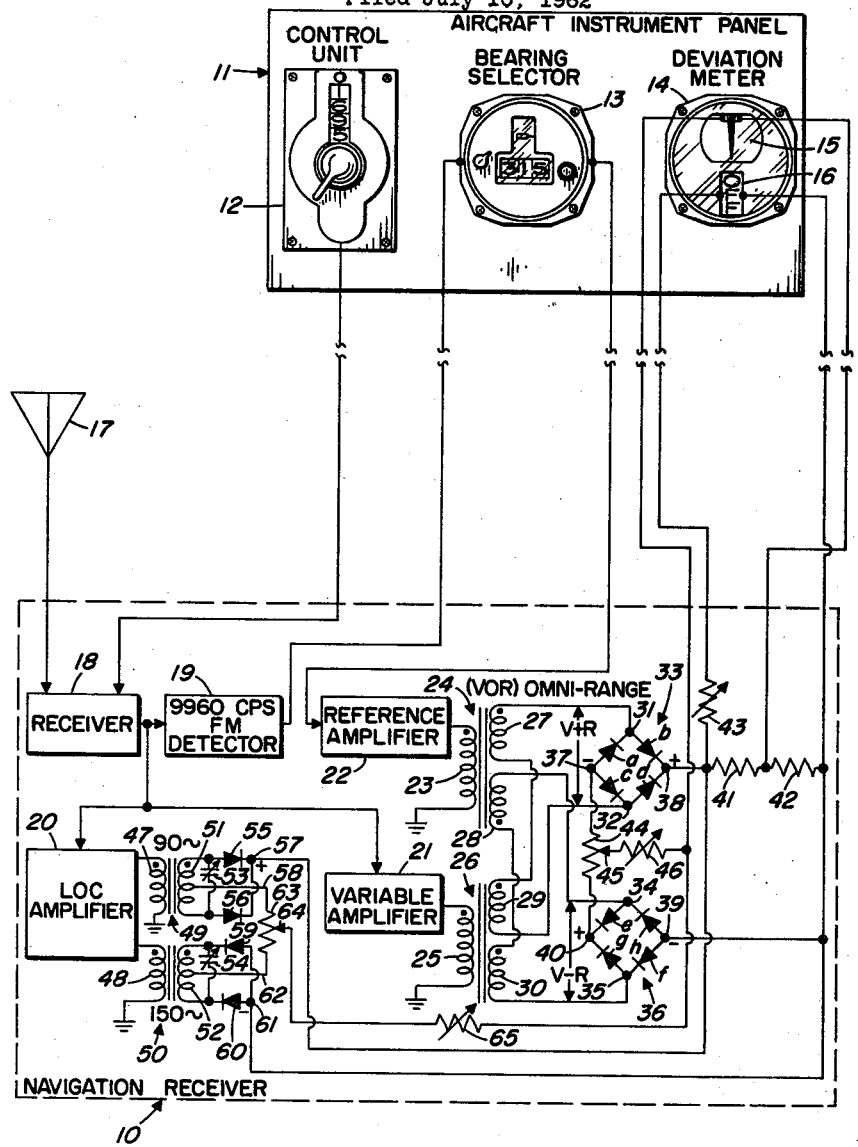
INVENTORS
Arthur L. Kemper
Ardis G. Vance
BY
*Woody and Kintzinger*
Attorneys 3,131,392
ALTERNATE FUNCTION VOR-LOC AIRCRAFT METER CIRCUIT
Arthur L. Kemper, Marion, and Ardis G. Vance, Toddville, Iowa, assignors to Collins Radio Company, Cedar Rapids, Iowa, a corporation of Iowa
Filed July 16, 1962, Ser. No. 210,135
8 Claims. (Cl. 343—107)

This invention relates in general to alternate function instrument circuits, and in particular to an alternate function VOR (visual omnirange) ILS/LOC (instrument landing system-localizer) circuit for a single instrument containing at least a deviation meter movement and a flag meter movement with both movements responsive to the selected function.

In instrumentation for aircraft having VOR combined with an (ILS/LOC) localizer function within a single instrument, containing both a deviation meter movement and a flag meter movement, both functions are displayed alternately as selected by manual control. In the VOR function the deviation indicator shows when the aircraft is on or off a selected omnirange radial, and the warning flag, if showing, indicates that the received signal is unreliable or that there is a navigation receiver malfunction. When a localizer signal is being received the deviation indicator shows the position of the aircraft with respect to the center line of the runway (lateral guidance) and again the position of the warning flag indicates whether or not the deviation indication is reliable.

Many of the circuit systems used for a combined VOR-LOC instrument having deviation and flag meter movements are switched from VOR to localizer function circuitry by a relay. Upon critical scrutiny it is quite likely that a relay in such systems will appear vulnerable and the most unreliable portion of the circuitry. Relay failure may have disastrous results. For example, with the aircraft on an instrument landing approach the relay will normally be in one position, then if the aircraft is on course and the localizer signal is reliable the warning flag is down indicating that the localizer signal is satisfactory and the cross-pointer needle will be centered. However, if the relay contact for the cross-pointer activating circuit has not closed for that relay position, due to dirty contacts or mechanical failure, the cross-pointer will still be centered because its meter movement is not energized regardless of aircraft position. This may mislead the pilot into thinking he is "on course" because the cross-pointer is centered and the flag is down indicating no malfunction. Conversely, failure of other relay contacts can cause the flag to indicate a malfunction when actually the cross-pointer indication is perfectly reliable. This places the aircraft in some jeopardy since the pilot has lost the use of important instrumentation, and particularly so when he is more likely to be dependent on such instrument indications as when adverse weather conditions are encountered. Similar relay malfunctions may be encountered when the equipment is ostensibly functioning properly for displaying the VOR function.

It is, therefore, a principal object of this invention to increase the factor of reliability and safety through elimination of electro-mechanical devices such as relays used for tuning and switching in an alternate function VOR-LOC combined meter circuit.

Further objects are to reduce system maintenance, improve component accessibility and reliability, to reduce circuit power requirements, and to minimize cooling requirements.

Features of this invention useful in accomplishing the above objects in alternate function VOR-LOC combined meter circuitry include orientation of signal rectifying diodes in both the VOR and LOC circuits, in place of a relay control, for preventing current flow of one function into the circuitry of the other function. Such diode blocking of current back flow prevents loading by the unused signal source. This prevents interaction of controls between the two circuits and gives complete individual circuit freedom for adjustment of respective centering and sensitivity potentiometers.

A specific embodiment representing what is presently regarded as the best mode for carrying out the invention is illustrated in the accompanying drawing.

In the drawing:

The figure represents an aircraft VOR-LOC navigation system activating at least a deviation meter movement and a flag movement in a single panel mounted instrument according to the VOR or LOC function selected by a frequency control unit of the instrument panel, and by the signals fed from the antenna, and a panel mounted bearing selector to the navigation receiver.

Referring to the drawing:

Navigation receiver 10 is remotely located from aircraft instrument panel 11 and the panel mounted frequency selective control unit 12, bearing selector 13, and the single instrument 14 having at least a deviation meter movement 15 and a flag movement 16. R-F signals sensed by antenna 17 are fed to the R-F receiver 18 of navigation receiver 10, which is frequency control tuned by the frequency selective control unit 12. The tuned frequency of R-F receiver 18 normally provides an internally detected output signal, which may be subject to further detection by detector 19 for the VOR function, or alternately as an activating input to LOC amplifier 20 for the ILS/LOC localizer function.

When receiver 18 is tuned for an omnirange signal an A-F 9960 c.p.s. subcarrier, amplitude modulated on the R-F carrier, is detected in the receiver and applied to F.M. detector 19. Simultaneously a 30 c.p.s. variable signal component of the detected omnirange signal, in the output of receiver 18, is also fed into variable amplifier 21 through its low-pass filter which attenuates signal frequencies above 30 c.p.s. The 9960 c.p.s. subcarrier is itself frequency modulated with a 30 c.p.s. reference signal. This 30 c.p.s. reference signal is detected in F.M. detector 19 and fed through the bearing selector 13 to reference amplifier 22. This 30 c.p.s. reference-phase signal is subject to phase shift in the course selector resolver of the omni-bearing selector 13 and, further, phase shift by filters and other components of the system.

The output of reference amplifier 22 is applied to the primary coil 23 of transformer 24 and the output of variable amplifier 21 is applied to the primary coil 25 of transformer 26. Each of these transformers has at least two secondary windings, transformer 24 with secondary coils 27 and 28, and transformer 26 with secondary coils 29 and 30.

The primary coils 23 and 25 and secondary coils 27, 29, and 30 have phasing as indicated by the phase dots and secondary coil 28 has reverse phasing as indicated by its phasing dot. With this phasing relation secondary coil 27 of transformer 24 and secondary coil 29 of transformer 26 are series connected and also connected to provide a $V+R$ omnirange signal to the input terminals 31 and 32 of four diode bridge 33. Secondary coil 28 of transformer 24 and secondary coil 30 of transformer 26 are series connected and also connected for applying a $V-R$ omnirange signal to the input terminals 34 and 35 of diode bridge 36.

The four diodes $a$, $b$, $c$, and $d$ of upper diode bridge rectifier 33 are so oriented in their respective legs between output terminal 37 and output terminal 38, anodes toward terminal 37 and cathodes toward terminal 38, as to provide, whenever a $V+R$ omnirange function is applied, that terminal 38 will be positive and terminal 37 negative. In like manner diodes *e, f, g,* and *h* of lower diode bridge rectifier 36 are so oriented in their respective legs between output terminal 39 and output terminal 40, anodes toward terminal 39 and cathodes toward terminal 40, as to provide, whenever a *V—R* omnirange function is applied, that terminal 39 will be negative and terminal 40 will be positive.

Resistors 41 and 42 are series connected between the terminal 38 of diode bridge 33 and the terminal 39 of diode bridge 36. The circuit for flag movement 26, including adjustable resistor 43, is also connected between terminal 38 and terminal 39. With this arrangement whenever the omnirange function is being applied and with both diode bridge 33 and diode bridge 36 providing rectified outputs, there is sufficient current flow through the flag meter circuit to hold the flag down out of sight. However, should there be no omnirange signal, or should either of the diode bridge circuits fail to provide a rectified output, there would be insufficient current flow from the omnirange function circuitry to hold the flag down out of sight. It should be noted that a diode (not shown) may be added in series with the flag meter movement for obtaining an improved nonlinear flag function, a faster almost snap action between the up off-flag position and the down out-of-sight position.

A centering potentiometer 44 is connected between output terminals 37 and 40 of diode bridges 33 and 36, respectively. The adjustable center tap 45 of potentiometer 44 is connected through an adjustable resistor 46 to deviation meter movement 15. The other side of deviation meter movement 15 is connected to the junction of resistors 41 and 42. Thus, the needle of deviation meter movement 15, a null instrument, will indicate a center on-course position whenever the rectified outputs of diode bridges 33 and 36 are balanced. However, whenever the aircraft is off course one way or another a potential will be developed between the adjustable tape 45 of the centering potentiometer 44 and the junction of resistors 41 and 42 that results in a suitable off-course indication by the deviation movement 15.

If receiver 18 is tuned by control unit 12 for localizer operation, a localizer R-F carrier is received which is amplitude modulated by a 90 c.p.s. signal and by a 150 c.p.s. signal. The 90/150 c.p.s. composite signal is detected within receiver 18 and applied to localizer amplifier 20. The 90 and 150 cycle tones are amplified within localizer amplifier 20 and separated by filters in the amplifier. The 90 and 150 cycle tones are then applied as input signals to the primary coils 47 and 48 of the 90-cycle transformer 49 and the 150-cycle transformer 50, respectively. Transformer 49 is provided with a center tapped secondary coil 51 and transformer 50 is provided with a center tapped secondary coil 52. The primary coils 47 and 48 and the secondary coils 51 and 52 are phased as indicated by the phasing dots. In transformer 49 the secondary coil 51 is tuned to resonance at 90 cycles with an appropriate parallel-connected capacitor 53. In transformer 50 the secondary coil is tuned to 150-cycle resonant frequency with an appropriate parallel-connected capacitor 54.

Two diodes 55 and 56 are connected, anodes to respective ends of 90-cycle tuned secondary coil 51 and cathodes to 90-cycle localizer function output terminal 57. This provides a diode rectifying circuit for the A.-C. output of the 90-cycle transformer 49 wherein a positive D.-C. voltage is provided at output terminal 57 and a relatively negative output D.-C. voltage at center tap line 58 whenever a 90-cycle signal is being passed by transformer 49. Two diodes 59 and 60 are connected, cathodes to respective ends of 150-cycle tuned secondary coil 52 and anodes to 150-cycle localizer function output terminal 61. This provides a diode rectifying circuit for the A.-C. output of the 150-cycle transformer 50 wherein a minus D.-C. voltage is provided at output terminal 61 and a relatively positive output D.-C. voltage at center tap line 62 whenever a 150-cycle signal is being passed by transformer 50.

The secondary coil center tap 58 of transformer 49 and the secondary coil center tap 62 of transformer 50 are connected to opposite ends of centering potentiometer 63. The adjustable tap 64 of centering potentiometer 63 is connected through adjustable resistor 65 (useful for adjusting localizer sensitivity) to a connection, in common with adjustable resistor 46, to deviation meter movement 15. The other side of deviation meter movement 15 is connected to the junction of resistors 41 and 42, which are series connected between localizer function output terminals 57 and 61 in parallel with their connection between the VOR function output terminals 38 and 39. Thus, the needle of deviation meter movement 15, a null instrument, will indicate a center on-course position whenever the rectified outputs of 90-cycle transformer 49 and 150-cycle transformer 50 are balanced. However, whenever the aircraft is off course, for example to the left of the localizer course, the 90-cycle per second signal predominates and the deviation indicator needle is deflected to the right. If the aircraft is off course to the right, the 150-cycle per second signal predominates and the deviation indicator needle is deflected to the left.

The circuit for flag movement 16 including adjustable resistor 43, in addition to being connected between terminals 38 and 39 in parallel with resistors 41 and 42, is connected between the localizer function output terminals 57 and 61. With this arrangement, whenever the localizer function is being applied and with both the diode rectifying circuit for the 90-cycle transformer 49 and the diode rectifying circuit for the 150-cycle transformer 50 providing rectified outputs, there is sufficient current flow through the flag meter circuit to hold the flag down out of sight. However, should there be no localizer signal, or should either of the localizer transformer diode rectifying circits fail to provide a rectified output, there would be insufficient current flow from the localizer function circuitry to hold the flag down out of sight.

During operation of either the omnirange function or the localizer function the positive and relatively negative outputs to common instrument circuitry have common polarity from one function to the other. Thus, the orientation of the rectifying diodes of each function and each portion of a function are such as to oppose any current flow from the activated function output into the circuitry of the nonactivated function. Such diode blocking of current backflow prevents loading by circuitry of the unused signal source. Interaction of controls between the two circuits is also prevented. Furthermore, this circuit arrangement gives complete individual circuit freedom and provides for individual adjustment of the respective centering and sensitivity potentiometers. In other words, the adjustment of centering potentiometer 45 for null positioning the needle of deviation meter movement 15 and adjustment of the sensitivity potentiometer 46 for adjusting responsive sensitivity of the deviation meter movement 15 are limited to the omnirange function and are accomplished when this function is activated. Adjustment of center tap 64 of the centering potentiometer 63 and adjustable resistor 65 provide the corresponding adjustments solely for the localizer function. Adjustable resistor 43 provides a sensitivity adjustment for the flag meter movement and may be adjusted for a flag movement operable to the down-out-of-sight position with a threshold current flow of approximately 250 amps.

Components used in alternate function VOR-LOC aircraft meter circuit as shown in the figure include the following:

| | |
|---|---|
| All A.-C. rectifying diodes | 1N457. |
| Resistor 41 | 215 ohms |
| Resistor 42 | 215 ohms |
| Resistor 43 | Adjusted to 2.5K ohms. |
| Resistor 44 | 100 ohms. |

| Resistor 46 | Adjusted to 250 ohms |
| --- | --- |
| Resistor 63 | 100 ohms. |
| Resistor 65 | Adjusted to 2.5K ohms. |

Whereas this invention is here illustrated and described with respect to a specific embodiment thereof, it should be realized that various changes may be made without departing from the essential contribution to the art made by the teachings hereof.

We claim:

1. In an alternate function visual omnirange and localizer navigation instrumentation system for aircraft, a radio frequency receiver; means for tuning said R-F receiver to omnirange and to localizer function frequencies; omnirange function signal responsive means including signal rectifying solid state devices connected for providing positive rectified direct current outputs and relatively negative D.-C. outputs; localizer function signal responsive means including signal rectifying solid state devices connected for providing positive rectified direct current outputs and relatively negative D.-C. outputs; voltage dividing means connected between positive D.-C. output terminals and relatively negative terminals of both function circuits; a difference indicating meter movement connected between voltage dividing means of each function in parallel; a voltage sum responsive meter movement connected between a positive output terminal and a relatively negative output terminal of both function circuits; and said meter movement circuits being so connected in common to both function circuits that the solid state rectifying devices of the non-activated function circuit block back current flow from the activated function circuit.

2. The alternate function instrumentation system of claim 1, wherein one of the voltage dividing means is connected in common to two output terminals of each function circuit; the other voltage dividing means are adjustable tap centering potentiometers; and an adjustable resistor is provided between the tap of each centering potentiometer and the difference indicating meter movement circuit.

3. The alternate function instrumentation system of claim 2, wherein an adjustable resistor is provided in the voltage sum responsive meter movement circuit; and with both said meter movements contained in a single instrument.

4. The alternate function instrumentation system of claim 1, wherein both said meter movements are mounted on an instrument panel remotely located from said radio frequency receiver and from said omnirange and localizer function circuits; said R-F receiver tuning means includes a frequency control unit mounted on said instrument panel; and wherein a bearing selector connected to the omnirange function circuit is mounted on said instrument panel.

5. In an alternate function visual omnirange and localizer navigation instrumentation system for aircraft, a radio frequency receiver; manual means for selectively frequency tuning said R-F receiver alternately to omnirange and to localizer function frequencies; omnirange function composite signal responsive means including a reference amplifier and a variable amplifier, two signal rectifying diode bridges each having two output terminals, and means coupling said reference and said variable amplifiers with said diode bridges to apply a variable-reference sum input to one of said diode bridges and a variable-reference difference input to the other diode bridge; the diodes of said diode bridges being so oriented that a positive and a relatively negative direct current output are provided at the respective output terminals of the two output terminals of each diode bridge when the omnirange function signal is being received; localizer function composite signal responsive means including a localizer amplifier, two signal rectifying diode circuit portions each having two output terminals, and said localizer amplifier being coupled to said diode portions with individual frequency tuned coupling devices; the diodes of said diode circuit portions being so oriented that a positive and a relatively negative direct current output are provided at the respective output terminals of the two output terminals of each diode circuit portion when the localizer function is being received; voltage dividing means connected between terminals of opposite potential of the diode bridges and of the diode circuit portions; a single difference indicating meter movement connected between the two voltage dividing means of each function in parallel; and an output voltage sum responsive meter movement connected between a positive terminal of one diode bridge and a relatively negative terminal of the other diode bridge in parallel with connection between a positive terminal of one of said diode circuit portions and a relatively negative terminal of the other said diode circuit portion.

6. The alternate function instrumentation system of claim 5, wherein the diodes of said diode bridges and said diode circuit portions are solid state diodes so oriented in the respective function circuits as to block current back flow from the activated function circuitry into circuitry of the non-activated function via the common connected circuitry of said meter movements.

7. The alternate function instrumentation system of claim 6, wherein one of the voltage dividing means is connected in common to two output terminals of both function circuits; the other voltage dividing means are adjustable centering potentiometers; and an adjustable resistor is provided between each centering potentiometer and the difference indicating meter movement circuit.

8. In an alternate function system for instrumentation having a difference indicating meter movement and an output voltage sum responsive meter movement; a signal source; means for tuning said signal source for at least two independent function signals; first means responsive to at least a first function signal of said signal source, and providing a first function rectified output; second means responsive to at least a second function signal of said signal source, and providing a second function rectified output; the first function means and the second function means each having two rectifying output portions; both rectifying output portions of each function means having rectifying devices so oriented that a positive and a relatively negative direct current output is provided at two output terminals of both rectifying output portions whenever the signal of the respective function means is being applied; voltage dividing means connected between terminals of opposite potential of the two rectifying portions of each function means; said difference indicating meter movement being connected between two voltage dividing means of each function means; and said output voltage sum responsive meter movement being connected between a positive terminal of one rectifying portion and a relatively negative terminal of the other rectifying portion of both function means in parallel.

No references cited.